Patented Mar. 14, 1933

1,901,507

UNITED STATES PATENT OFFICE

FRITZ GUENTHER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

MIXTURES OF SULPHONATED ALKYLATED NONDYEING AROMATIC CARBOCYCLIC COMPOUNDS AND THEIR SALTS

No Drawing. Application filed August 4, 1931, Serial No. 555,070, and in Germany July 11, 1924.

The present invention relates to the production of soap-like substances.

It has already been proposed, inter alia by the present inventor, to produce wetting, cleansing and dispersing agents by introducing alkyl groups into naphthalene or other aromatic hydrocarbons, and sulphonating the hydrocarbons before or after alkylation, the quantity of alkyl groups and especially of butyl groups being always below 2.2 molecular proportions for each molecular proportion of hydrocarbon in the final product.

I have now found that particularly valuable products are obtained by condensing aromatic non-dyeing compounds, such as hydrocarbons or their derivatives, as for example halogenated hydrocarbons, phenols, naphthols, anilines or naphthylamines, or the sulphonic acids of these compounds with a butyl alcohol, the proportions being such that, for each molecule of the hydrocarbon, more than 2.2 molecules, but not substantially more than 4 molecules of the aforesaid alcohol come into operation, the resulting products being sulphonated if they do not already contain any sulphonic groups. Non-dyeing aromatic compounds must be chosen, since otherwise products might be obtained which are inoperative for the desired purposes.

The properties of the new sulphonic acid substances obtained, i. e. of the free sulphonic acids and their water-soluble chemical combinations or salts with alkalies, such as alkali metals, ammonia, aliphatic or aromatic amines or hydroxy-alkyl amines, exhibit, as compared with the properties of those already known, a substantially increased efficiency, and indeed to a degree that could not have been anticipated. Thus, for example, the wetting properties of the products obtained even with 2.7 to 3 molecular proportions of iso-butyl-, normal- or secondary butyl alcohols and 1 molecule of naphthalene, in conjunction with the employment of sulphuric acid, are approximately twice as great as those obtained with the corresponding dibutyl naphthalene sulphonic acids or their salts. The dispersive capacity in respect of the dispersion of fatty oils, mineral oils, waxes, hydrocarbons, dyestuffs and like water-insoluble materials is similarly increased. Moreover, the levelling action of the products obtainable under the specified condition is considerably greater by comparison with those already known, this being particularly manifest in dyeing wool in an acid bath with dyestuffs which do not readily distribute uniformly.

Substances particularly adapted for the production of the said sulphonic acids comprise the polynuclear aromatic hydrocarbons, such as naphthalene, diphenyl, phenanthrene or tetrahydronaphthalene or commercial mixtures containing the said hydrocarbons though mono-nuclear hydrocarbons, such as benzene or toluene, and the aforesaid derivatives of the said hydrocarbons may be also employed. As has been pointed out above the different primary, secondary, or tertiary butyl alcohols with straight or branched chain, such as n-butyl alcohol, methylethylcarbinol or trimethyl carbinol, are brought to action on the initial materials, and they may be employed as such or in the form of their esters such as sulphuric or phosphoric esters, dialkyl sulphates and the like. These alcohols or esters may be employed singly or as mixtures. In order to facilitate the reaction it is advantageous to operate in the presence of inert solvents or diluents, such as carbon tetrachloride, trichlorethylene, ethyl ether and the like.

The process may be carried out in various ways, for example by first sulphonating the aromatic hydrocarbons and then introducing the alkyl radicles, or the hydrocarbons may first be alkylated and the sulphonation effected afterwards, or the alkylation and sulphonation may be performed simultaneously. The usual sulphonating agents, such as sulphuric acid, fuming sulphuric acid, chlorsulphonic acid, sulphuric anhydride and the like, are suitable for the sulphonation treatment. In some cases it is preferable to add acid chlorides, such as phosphorus trichloride, phosphorus pentachloride, chlorosulphonic acid, acetyl chloride with or without phosphorus pentoxide, as catalysts if desired in conjunction with the aforesaid solvents or diluents. The duration of the reaction, concentration of the acid, temperature, and so forth, depend on the substances employed, and may be varied accordingly. The optimum amount of the alcohol or ester, within the prescribed limits, can be easily ascertained, by a preliminary experiment, and will depend on the properties of the desired substance in respect of wetting, dispersive and levelling properties, and the like. In most cases, the best products will be obtained with a quantity of alcohol ranging between 2.5 and 3.6 molecular proportions, referred to the amount of the aromatic hydrocarbon employed. Larger quantities than about 4 molecules of alcohol or ester are generally not used according to the present invention, since they effect only a slight further improvement in the wetting properties, so that their employment is uneconomical.

The following examples will further illustrate how the said invention may be carried out in practice but the invention is not restricted to these examples. The parts are by weight.

Example 1

128 parts of naphthalene are converted into beta-naphthalene sulphonic acid by heating with 128 parts of sulphuric acid of 67° Bé. to about 150° C. for 5 hours. The mass is cooled to 120° C., mixed with 100 parts of sulphuric acid of 67° Bé. and further cooled to from 80° to 85° C. While maintaining the mixture of the sulphonic acid and sulphuric acid at this temperature, a mixture of 200 parts of ordinary commercial concentrated sulphuric acid of 66° Bé. and 222 parts of iso-butyl alcohol is allowed to run into the sulphonic acid mixture in the course of 2 hours while vigorously stirring. When all of this mixture has run in, the temperature of the mixture is raised to about 100° C. at which temperature the reaction is completed in the course of a few additional hours. Thereupon the mass is poured into water and separated from any oil, neutralized with lime, filtrated and decomposed with sodium carbonate in the usual manner. By evaporating, the poly-butylated naphthalene sulphonic acid sodium salt is obtained in the form of a slightly yellowish powder. When normal butyl alcohol is used the mass directly forms two layers, the upper layer of which represents chiefly the free butylated naphthalene sulphonic acid.

The said sulphonic acids which may also be employed in the form of their salts are of special value as they are not decomposed by acids or calcareous water in which cases soap cannot be used. As examples of suitable application I quote the preparation of solutions or emulsions of fats and oils, hydrocarbons or derivatives thereof, chloroform and similar liquors with sulphonic acids or their salts or aqueous solutions thereof, or the use of the said substances for washing and cleansing purposes, for liquors for milling wool or for baths for dyeing in the lather.

Example 2

700 parts of n-butanol and 440 parts of naphthalene are treated at a temperature of from 20° to 25° C. with 2700 parts of sulphuric acid, containing about 16 per cent of sulphur trioxide, and are stirred at a temperature of 45° to 55° C. until a sample shows that the product has become completely soluble in water. After standing a short time, two layers are obtained the upper one containing multi-butylated naphthalene sulphonic acid, which is then separated from the spent sulphuric acid in the usual manner, and may, if desired, be converted into the alkali salt. By comparison with the sodium salt of dibutyl naphthalene sulphonic acid, this product displays substantially higher wetting, levelling and emulsifying capacities.

Example 3

200 parts of chlorsulphonic acid, followed by 600 parts of concentrated sulphuric acid, are stirred into 200 parts of n-butanol at about from 20° to 25° C., cooling measures being applied for maintaining the said temperature. 87 parts of naphthalene are then added and the mixture is stirred, at from 45° to 55° C. until a sample is found to be completely soluble in water. Stirring is then stopped, and after standing for a short time, the reaction product separates into two layers. The upper layer, containing the highly butylated naphthalene sulphonic acid, is separated from the spent sulphuric acid beneath, and, if desired, is converted into the corresponding alkali salts by neutralization with alkalies. The preparations constitute very high-grade wetting, emulsifying and dispersion agents.

Example 4

750 parts of sulphuric acid containing 16 per cent of sulphur trioxide are introduced, at about 40° C. into a mixture of 128 parts of naphthalene, 112 parts of n-butanol and 200 parts of an aliphatic alcohol, with a chain length of about 15 carbon atoms, and prepared from soya bean oil by catalytic hydrogenation. The mixture is stirred until completely soluble in water and after the stirring has been stopped, two layers will form which are separated in the usual manner. The upper layer contains the multi-substituted naphthalene sulphonic acid, which may be employed directly, or in the form of its alkali salt, and represents an excellent washing and emulsifying agent.

Example 5

433 parts of naphthalene and 750 parts of pure isobutyl alcohol are treated at about from 25° to 30° C. with 2800 parts by weight of sulphuric acid, containing 16 per cent of sulphur trioxide, and the mixture is stirred for a period of from 10 to 15 hours at 30° C. After prolonged standing, the mixture separates into two layers from the upper of which multi-isobutylated naphthalene sulphonic acid is isolated.

Example 6

Naphthalene di-sulphonic acid is prepared from 128 parts of naphthalene and 600 parts of concentrated sulphuric acid by prolonged stirring at 150° to 160° C., and after adding 300 parts of concentrated sulphuric acid, the melt is stirred at from 90° to 95° C. with a mixture of 200 parts of n-butanol and 300 parts of concentrated sulphuric acid, until the mixture has become completely soluble in water. In this case there is no separation into layers. The corresponding alkali salts can be recovered by neutralization with alkalies, and, if desired, may be purified from sulphates by treatment with lime and subsequent filtration. Since these products are also very soluble in concentrated acid and saline solutions they are particularly suitable as wetting agents for precipitation baths in the artificial silk industry.

Example 7

260 parts of diphenyl (melting point about 70° C.) are stirred with 375 parts of n-butanol and 1400 parts of fuming sulphuric acid containing 8 per cent of sulphur trioxide at from 40° to 45° C. until 2 layers are formed in the reaction mass. After standing for some time, the lower layer consisting of sulphuric acid is drawn off. The butylated diphenyl sulphonic acid can be converted into the desired alkali metal salt and possesses a considerably higher wetting power than a product prepared in the same manner from 2 molecular proportions of butanol per molecular proportion of diphenyl.

Example 8

375 parts of n-butanol are mixed, while carefully cooling, with 1400 parts of fuming sulphuric acid containing 8 per cent of sulphur trioxide and then 300 parts of phenanthrene are introduced and the mixture is stirred at 40° C. until the tri-butyl phenanthrene sulphonic acid separated from the layer of concentrated sulphuric acid; the latter is removed and the sulphonic acid is neutralized and dried, the neutralization being carried out either with lime or with an alkali metal compound. The alkali metal salts are valuable wetting, levelling and emulsifying agents and are superior in their efficiency to the alkali metal salts of a phenanthrene sulphonic acid containing 2 butyl radicals only.

Example 9

270 parts of chlorsulphonic acid are stirred, while cooling, into 200 parts of n-butanol and then 600 parts of concentrated sulphuric acid and finally 163 parts of $\beta$-chlornaphthalene are introduced while stirring and cooling. The mixture is then warmed to from 45° to 50° C. and stirred at this temperature until it is rendered soluble in water and 2 layers are formed. The reaction product is worked up as described in the foregoing examples.

Example 10

150 parts of concentrated sulphuric acid and 220 parts of n-butanol are introduced at 25° C. into a mixture of 140 parts of purified tetrahydro-naphthalene and 150 parts of concentrated sulphuric acid and then 500 parts of fuming sulphuric acid containing 25 per cent of sulphur trioxide are added and the whole is stirred at from 35° to 40° C. for several hours until it is rendered soluble in water. The sodium salt of the butylated tetrahydro-naphthalene sulphonic acid is recovered by means of lime and conversion of the calcium salt with sodium carbonate. The product obtained possesses a substantially higher wetting, emulsifying and levelling power than a di-butyl tetrahydronaphthalene sulphonic acid.

This application is a continuation in part of my copending application Ser. No. 49,447 filed August 10, 1925.

What I claim is:—

1. Sulphonic acid compositions selected from the group consisting of mixtures of sulphonic acids of a mixture of non-dyeing aromatic carbocyclic compounds, containing from 2.3 to about 4 butyl radicles per each molecular proportion of said carbocyclic compound, and salts of said sulphonic acid mixtures.

2. Sulphonic acid compositions selected from the group consisting of mixtures of sulphonic acids of a mixture of non-dyeing aromatic carbocyclic compounds, containing from 2.5 to 3.6 butyl radicles per each molecular proportion of said carbocyclic compound, and salts of said sulphonic acid mixtures.

3. Sulphoic acid compositions, comprising a combination of an alkali with a sulphonic acid mixture of a mixture of non-dyeing aromatic carbocyclic compounds containing from 2.3 to about 4 butyl radicles per each molecular proportion of said carbocyclic compound.

4. Sulphonic acid compositions, comprising alkali metal salts of a sulphonic acid of a mixture of non-dyeing aromatic carbocyclic compounds containing from 2.5 to 3.6 butyl radicles per each molecular proportion of said carbocyclic compound.

5. Sulphonic acid compositions selected from the group consisting of mixtures of sulphonic acids of a mixture of polynuclear non-dyeing aromatic carbocyclic compounds containing from 2.3 to about 4 butyl radicles per each molecular proportion of said carbocyclic compound, and salts of said sulphonic acid mixtures.

6. Sulphonic acid compositions selected from the group consisting of mixtures of sulphonic acids of a mixture of polynuclear aromatic hydrocarbons containing from 2.5 to 3.6 butyl radicles per each molecular proportion of said hydrocarbon, and salts of said sulphonic acid mixtures.

7. Sulphonic acid compositions selected from the group consisting of mixtures of sulphonic acids of a mixture of naphthalene homologues containing from 2.3 to about 4 butyl radicles per each molecular proportion of naphthalene, and salts of said sulphonic acid mixtures.

8. A sulphonic acid composition consisting of a sulphonic acid mixture of a mixture of naphthalene homologues containing from 2.5 to 3.6 n-butyl radicles per each molecular proportion of naphthalene.

9. A sulphonic acid composition consisting of a water-soluble salt of a sulphonic acid mixture of a mixture of naphthalene homologues containing from 2.5 to 3.6 n-butyl radicles per each molecular proportion of naphthalene.

10. A sulphonic acid composition consisting of an alkali metal salt of a sulphonic acid mixture of a mixture of naphthalene homologues containing from 2.5 to 3.6 n-butyl radicles per each molecular proportion of naphthalene.

In testimony whereof I have hereunto set my hand.

FRITZ GUENTHER.